United States Patent [19]

Suda et al.

[11] 3,927,114

[45] Dec. 16, 1975

[54] PROCESS FOR SEPARATING HYDROPEROXIDES

[75] Inventors: Hideaki Suda, Takaishi; Iwao Dohgane, Nishinomiya; Takashi Chinuki, Toyonaka; Kenji Tanimoto; Hirokazu Hosaka, both of Minoo; Yukimichi Nakao, Kobe; Yuji Ueda, Izumiotsu; Seiya Imada, Sakai; Hideki Yanagihara, Toyonaka; Kunihiko Tanaka, Ibaragi, all of Japan

[73] Assignee: Sumitomo Chemical Company, Ltd., Osaka, Japan

[22] Filed: July 9, 1973

[21] Appl. No.: 377,656

[30] Foreign Application Priority Data

July 19, 1972 Japan.................................. 47-72852

[52] U.S. Cl............................................. 260/610 A
[51] Int. Cl.$^2$...................................... C07C 179/02
[58] Field of Search ..................... 260/610 A, 610 B

[56] References Cited
UNITED STATES PATENTS 2,691,683  10/1954  Lorand et al. .................. 260/610 A
3,003,002  10/1961  Feinstein............................ 260/616

FOREIGN PATENTS OR APPLICATIONS 920,013  3/1963  United Kingdom............. 260/610 A
573,072  3/1959  Canada........................... 260/610 A

OTHER PUBLICATIONS

"Condensed Chemical Dictionary," Fifth Ed. (1956) Reinhold Pub., pp. 107; 619; 597 and 1186.
Stamicarbon, "Chem. Abs." p. 5899 (1955), Vol. 49.

*Primary Examiner*—James O. Thomas, Jr.
*Assistant Examiner*—W. B. Lone
*Attorney, Agent, or Firm*—Stevens, Davis, Miller & Mosher

[57] ABSTRACT

Dihydroperoxides are separated from a solution of hydroperoxides containing dihydroperoxides, for example, an oxidation product solution of dialkylbenzenes, by contacting the solution with an ion exchanger, for example, strongly basic anion exchange resin, and eluting with an eluting agent such as aqueous alkaline solutions, ketons having 3 to 10 carbon atoms, alcohols having 1 to 8 carbon atoms and ethers having 2 to 5 carbon atoms.

7 Claims, No Drawings

PROCESS FOR SEPARATING HYDROPEROXIDES

This invention relates to a process for separating dihydroperoxides from a solution containing them by contacting the solution with ion exchangers, thereby selectively separating the dihydroperoxides from the solution.

More particularly, the present invention relates to a process for separating dihydroperoxides (hereinafter referred to as DHPO) of the formula,

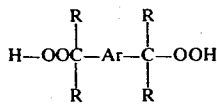  (I)

wherein R represents a $C_1$-$C_2$ alkyl group and Ar represents an aromatic group, of dialkylaromatic hydrocarbons of the formula,

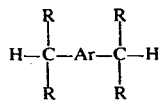  (II)

wherein R and Ar have the same meanings an above from an oxidation mixture of hydroperoxides containing monohydroperoxides (hereinafter referred to as MHPO), dihydroperoxides (hereinafter referred to as DHPO), hydroperoxides of the following formula (III) (hereinafter referred to as CHPO) and other hydroperoxides of the following formula (IV) (hereinafter referred to as AHPO) of dialkylaromatic hydrocarbons, and said CHPO being represented by the general formula:

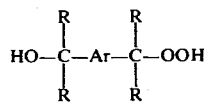  (III), wherein R and Ar are as defined above and said AHPO being represented by the general formula:

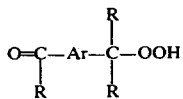  (IV), wherein R and Ar as defined above, by contacting the solution with ion exchangers, thereby selectively separation DHPO from the solution.

Oxidation of dialkylaromatic hydrocarbons by molecular oxygen or air gives CHPO of carbinol type and AHPO of ketone type as by-products in addition to MHPO and DHPO of the dialkylaromatic hydrocarbons. It is known to treat a solution mixture containing these compounds with an aqueous alkali solution to separate it into MHPO and a mixture of DHPO and CHPO (Japanese Pat. No. 428/56).

However, it is impossible to separate the mixture of DHPO and CHPO into the respective components according to said prior art, and behavior of AHPO has not been clarified yet.

On the other hand, it is well known that DHPO is an important intermediate for producing divalent phenols such as resorcinol and hydroquinone by cleavage of DHPO with an acid catalyst. However, no process has been yet available for obtaining DHPO with a good purity, and therefore DHPO must be cleaved as the hydroperoxide with a poor purity, for example, in such a state that DHPO contains CHPO in the above case. CHPO also undergoes cleavage by the acidic catalyst at the same time, and alkenylphenols having unsaturated bonds are formed thereby. It is known that the alkenylphenols readily react with the divalent phenols to form addition compounds, and the resulting addition compounds make the successive steps considerably complicated, and chiefly cause to lower the yields of the divalent phenols at the same time.

As a result of studies on a process for selectively separating only DHPO from the solution of hydroperoxides to overcome said disadvantages encountered in the prior art, the present inventors have found that DHPO can be selectively separated with a good purity by contacting said solution with ion exchangers.

Thus, the present invention is to provide a process for separating dihydroperoxides of the formula (I) from an oxidation product of dialkylaromatic hydrocarbons of the formula (II), the oxidation product containing monohydroperoxides, dihydroperoxides, carbinol type hydroperoxides of the formula (III), and ketone type hydroperoxides of the formula (IV), which comprises contacting the oxidation product with an ion exchanger to adsorb the dihydroperoxides on the ion exchanger, and eluting the dihydroperoxides adsorbed on the ion exchanger with an eluting agent.

In the present invention, the dialkylaromatic hydrocarbons include each o-, m- and p- isomers, particularly m- and p-isomers, and a mixture thereof in which the mixing proportion thereof is not critical.

Ion exchangers, for example, ion exchange resins, have been heretofore broadly utilized in separation, measurement, preparation, etc., but there has been no example of applying ion exchange resins to the separation of hydroperoxides as in the present invention, and such application has been made for the first time by the present inventors and their excellent selectivity has been clarified by the present inventors.

It is almost impossible or quite impossible to separate DHPO with a high purity from a solution containing DHPO and other hydroperoxides, because the hydroperoxides themselves are unstable and are also similar to one another in their properties, but the separation has been made possible, for the first time, by treating the solution with ion exchangers. Therefore, the present invention has a very great industrial value.

According to the present invention, DHPO can be obtained with a high purity by contacting a solution containing MHPO, DHPO, CHPO, AHPO, etc. with ion exchangers of anion exchange type, that is, anion exchangers, thereby selectively adsorb DHPO on the ion exchangers while separating DHPO from other hydroperoxides, and recovering DHPO from the ion exchangers by a suitable elution treatment, for example, by a solvent. The present process can be carried out effectively in the industrial scale, owing to the excellent selectively of the ion exchangers.

The ion exchangers used in the present invention are of anion exchange type, preferably of strongly basic anion exchange type, and can be used in various forms such as ion exchange resins, ion exchange paper, ion exchange liquid, etc.

Explanation will be made in detail by way of ion exchange resins, most typical ion exchanger. The ion exchange resins used in the present invention are strongly or weakly basic resins in macroporous or gel state, which have quaternary amines, for example, —$N(CH_3)_3Cl$ and —$N(CH_3)_2(C_2H_4OH)Cl$ or tertiary, secondary or primary amines of the formula —$N(R')_2$, wherein R' represents hydrogen atom or methyl or ethyl group, the R's may be the same or defferent, as exchange groups on a polystyrene matrix prepared by the polymerization of styrene alone or copolymerization of styrene and divinylbenzene, and/or a polycondensate matrix prepared by the condensation of phenol and formalin, or epichlorohidrin and a polyamine. Commercially available ion exchange resins of this type are Amberist A-26, Amberite IRA-900 and Amberite IRA-400 made by Organo Co. Japan; Dowex 1-XI made by Dow Chemical Co., U.S.A; Lewatit M-2 made by Farbenfabriken Bayer AG, Germany; Duolite A-1 made by Chemical Process Co., U.S.A; Diaion A made by Mitsubishi Chemical Industries, Ltd., Japan.

The solution containing hydroperoxides can be treated in an industrial scale with ion exchange resins according to a batch or column process.

An eluting agent usually applicable to the anion exchange resins can be also applied to the recovery of DHPO from the pregnant ion exchange resins. The preferable eluting agents include aqueous alkaline solutions such as about 0.5 to 5 % sodium hydroxide solution, ketones having 3 to 10 carbon atoms, for example, acetone, methyl ethyl ketone, methyl isobutyl ketone, diisopropyl ketone and methyl isopropyl ketone, alcohols having 1 to 8 carbon atoms such as methanol, ethanol, isopropanol and tert-butanol and ethers having 2 to 5 carbon atoms such as dimethyl ether, diethyl ether and diisopropyl ether. The hydroperoxides can be recovered from these eluting agents according to any one of the well known recovering processes.

A small amount of the solution attaches to the surfaces of the ion exchange resins withdrawn after the contact of the solution of the hydroperoxides with the ion exchange resins, and is recoverable together with DHPO at the successive eluting step resulting in decrease in the purity of DHPO. Therefore, it is favorable to wash the surfaces of ion exchange resin between the contacting operation with the ion exchange resins and the successive eluting operation of the ion exchange resins. However, DHPO should never be eluted in the washing operation. The present inventors have found that aromatic hydrocarbons, which may have at least one lower alkyl substituent group, are particularly preferable and effective washing solvents for washing the pregnant ion exchange resins. Examples of said solvents include benzene, toluene, xylene, ethylbenzene, ethyltoluenes, isopropylbenzene, isopropyltoluenes and diisopropylbenzenes. That is, MHPO, CHPO and AHPO can be mainly washed away from the hydroperoxides on the surfaces of the ion exchange resins with said washing solvent, without any elution of DHPO. Therefore, the purity of DHPO can be very effectively increased by washing the pregnant ion exchange resins with said washing solvent, if required. The process of the present invention can be carried out at a temperature of 0°C or higher, usually 15° to 50°C, and other conditions such as the amount of the resin, the contacting time, the eluting time and the like, depends upon the kind and quality of the ion exchange resin to be used.

The present invention can be most advantageously applied to separation and purification of hydroperoxides in a process for producing resorcinol and hydroquinone from alkylbenzenes.

The present invention will be described in detail by way of examples, where parts and % are by weight, unless otherwise especially indicated.

EXAMPLE 1

A solution consisting of 32.18 parts of MHPO of a mixture of m-and p-diisopropylbenzenes (m- : p- = 65 : 35), 2.19 parts of AHPO thereof, 5.94 parts of CHPO thereof, 14.49 parts of DHPO thereof and 45.20 parts of a mixture of m-and p-diisopropylbenzens (m- : p- = 65 : 35) is placed in a glass vessel together with 50 parts of anion exchange resins, Dowex 1-XI, made by Dow Chemical Co., U.S.A., and stirred at room temperature for 30 minutes thereby to contact the solution with the resins. Then, the ion exchange resins and the solution are separated from each other. Then, the ion exchange resins are heated at 60°C for 30 minutes together with 100 parts of methylisobutylketone as an eluting solvent, and then the ion exchange resins are again separated from the organic solvent layer. 102.65 parts of the resulting organic solvent layer containing 0.56 parts of MHPO, 0.02 parts of AHPO, 0.17 parts of CHPO, 7.47 parts of DHPO and 4.43 parts of the mixture of m-and p-diisopropylbenzenes are obtained. The mixture of m-and p- diisopropylbenzenes can be readily separated from the organic solvent layer according to the well known method.

EXAMPLE 2

25 parts (dry basis) of Amberist A-26 (ion exchange resins made by Organo Co., Japan) is packed into a resin column having 60 parts by volume, and 100 parts of an oxidation product solution of m-and p-diisopropylbenzenes (m- : p- = 65 : 35) containing hydroperoxides, that is, 27.43 parts of MHPO, 2.80 parts of AHPO, 7.16 parts of CHPO, 27.88 parts of DHPO, etc., is passed through the resin column at a flow rate of 3 parts by volume per minute. Successively, the ion exchange resins are washed with 100 parts of m-and p-diisopropylbenzenes. 102.22 parts of the resulting washing solution contains 0.48 parts of MHPO, 0.88 parts of AHPO, 0.42 parts of CHPO and 1.52 parts of DHPO.

Then, 100 parts of an aqueous 2.5 % sodium hydroxide solution is passed through the resin column at a flow rate of one part by volume per minute, whereby 106.48 parts of an eluate containing 0.04 parts of MHPO, 17.20 parts of DHPO and 1.24 parts of m-and p-diisopropylbenzenes and others is obtained.

EXAMPLE 3

100 parts of an oxidation product solution of di-sec.-butylbenzene by air, containing 14.25 parts of MHPO, 7.09 parts of AHPO, 0.95 parts of CHPO and 7.15 parts of DHPO is passed through a resin column packed with 30 parts by volume of Duolite A-1, commercially available ion exchange resins made by Chemical Process Co., U.S.A., at a flow rate of 3 parts by volume per minute.

Then, the ion exchange resins are washed with 30 parts of di-sec.-butylbenzene, and then 50 parts of ethanol is passed through the resin column at a flow rate of 0.5 parts by volume per minute to effect elution. 50.7 parts of the resulting eluate contains 0.59 parts of MHPO, 0.04 parts of AHPO, 0.08 parts of CHPO and 2.33 parts of DHPO.

What is claimed is:

1. A process for separating dihydroperoxides of the formula,

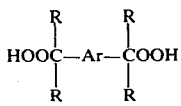

wherein R is a $C_1$–$C_2$ alkyl group and Ar is an aromatic phenylene group, from oxidation product of dialkylaromatic hydrocarbons of the formula,

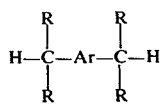

wherein R and Ar have the same meanings as above, the oxidation product containing monohydroperoxides, dihydroperoxides, carbinol type hydroperoxides of the formula,

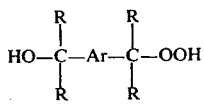

wherein R and Ar are as defined above, and ketone type hydroperoxides of the formula,

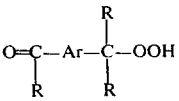

wherein R and Ar are as defined above, which comprises contacting the oxidation product with a basic ion exchange resin in microporous or gel state to adsorb the dihydroperoxides on the ion exchange resin, and eluting the dihydroperoxides adsorbed on the ion exchanger with an eluting agent said eluting agent is one member selected from aqueous alkaline solutions, ketones having 3 to 10 carbon atoms, alcohols having 1 to 8 carbon atoms and ethers having 2 to 5 carbon atoms.

2. The process according to claim 1, wherein the ion exchanger is a basic resin in macroporous or gel state, which has quaternary, tertiary, secondary or primary amine groups as an exchange group on a polystyrene matrix prepared by the polymerization of styrene or styrene and divinylbenzene, and/or a polycondensate matrix prepared by the condensation of phenol and formalin, or epichlorohidrin and a polyamine.

3. The process according to claim 2, wherein the quaternary amine group is —$N(CH_3)_3Cl$ and/or —$N(CH_3)_2(C_2H_4OH)Cl$.

4. The process according to claim 2, wherein the tertiary, secondary or primary amine group is represented by —$N(R')_2$, wherein R' is hydrogen atom or methyl or ethyl group, the R's may be the same or different.

5. The process according to claim 1, wherein the dialkylaromatic hydrocarbon is diisopropylbenzene.

6. The process according to claim 1, wherein the pregnant ion exchanger is washed with an aromatic hydrocarbon prior to the elution.

7. The process according to claim 6, wherein the aromatic hydrocarbon is one member selected from benzene, toluene, xylene, ethylbenzene, ethyltoluenes, isopropylbenzene, isopropyltoluenes and diisopropylbenzene.

* * * * *